(12) United States Patent
Takahashi et al.

(10) Patent No.: US 11,725,092 B2
(45) Date of Patent: Aug. 15, 2023

(54) FOAM MOLDED ARTICLE

(71) Applicant: Panasonic Intellectual Property Management Co., Ltd., Osaka (JP)

(72) Inventors: Yoshie Takahashi, Osaka (JP); Masashi Hamabe, Osaka (JP); Masayoshi Imanishi, Osaka (JP); Toshifumi Nagino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 608 days.

(21) Appl. No.: 16/750,035

(22) Filed: Jan. 23, 2020

(65) Prior Publication Data

US 2020/0255619 A1    Aug. 13, 2020

(30) Foreign Application Priority Data

Feb. 8, 2019    (JP) .................................. 2019-021411

(51) Int. Cl.
*C08J 9/34* (2006.01)
*B29C 44/34* (2006.01)
*C08J 9/00* (2006.01)
*B29K 23/00* (2006.01)

(52) U.S. Cl.
CPC .............. *C08J 9/34* (2013.01); *B29C 44/3442* (2013.01); *C08J 9/00* (2013.01); *C08J 9/0085* (2013.01); *B29C 2791/002* (2013.01); *B29K 2023/08* (2013.01); *B29K 2023/14* (2013.01); *B29K 2023/22* (2013.01); *B29K 2493/00* (2013.01); *C08J 2205/10* (2013.01); *C08J 2323/12* (2013.01)

(58) Field of Classification Search
CPC ..... C08J 9/34; C08J 9/00; C08J 9/0085; C08J 2205/10; C08J 2323/12; C08J 2201/03; C08J 2205/042; C08J 2205/048; C08J 9/16; C08J 9/103; C08J 9/0061; C08J 9/08; C08J 9/105; C08J 9/107; C08J 9/122; C08J 2203/02; C08J 2203/04; C08J 2203/06; C08J 2203/08; C08J 2401/02;
(Continued)

(56) References Cited

U.S. PATENT DOCUMENTS

2006/0148917 A1\* 7/2006 Radwanski ........... A61F 13/537
                                                             521/99
2009/0155567 A1   6/2009 Sugawara et al.
(Continued)

FOREIGN PATENT DOCUMENTS

CN    105602179    5/2016
JP    63-265934    11/1988
(Continued)

OTHER PUBLICATIONS

Extended European Search Report dated Jun. 4, 2020 in corresponding European Patent Application No. 20155536.4.
(Continued)

*Primary Examiner* — Kara B Boyle
(74) *Attorney, Agent, or Firm* — Wenderoth, Lind & Ponack, L.L.P.

(57) ABSTRACT

A foam molded article includes a main agent resin, a filler of greater than or equal to 15% by mass and less than or equal to 80% by mass, and a foaming agent of greater than or equal to 0.01% by mass and less than or equal to 10% by mass, and a foaming ratio caused by the foaming agent is greater than or equal to 1.1 times.

6 Claims, 3 Drawing Sheets

(58) Field of Classification Search
CPC .......... B29C 44/3442; B29C 2791/002; B29C 44/02; B29K 2023/08; B29K 2023/14; B29K 2023/22; B29K 2493/00
See application file for complete search history.

(56) References Cited

U.S. PATENT DOCUMENTS

| | | |
|---|---|---|
| 2010/0010107 A1 | 1/2010 | Sugimae et al. |
| 2013/0209784 A1 | 8/2013 | Nakagawa et al. |
| 2017/0190085 A1 | 7/2017 | Suenaga et al. |

FOREIGN PATENT DOCUMENTS

| | | | |
|---|---|---|---|
| JP | 10-138307 | | 5/1998 |
| JP | 2007-56176 | | 3/2007 |
| JP | 2007308583 A | * | 11/2007 |
| JP | 2015010102 A | * | 1/2015 |
| JP | 6351574 B | | 7/2018 |
| WO | 2008/026645 | | 3/2008 |
| WO | 2009/095426 | | 8/2009 |
| WO | 2012/060392 | | 5/2012 |

OTHER PUBLICATIONS

English Translation of Chinese Search Report dated Oct. 31, 2022 in corresponding Chinese Patent Application No. 202010081130.8.

\* cited by examiner

FIG. 5

| | Filler amount % | Proportion of filler having aspect ratio of lower than or equal to 2 % | Proportion of filler having aspect ratio of higher than or equal to 10 % | Mass concentration ratio of filler | | Foaming agent amount % | Foaming ratio | Foaming cell diameter | | Elastic modulus GPa | | Drop impact test | Weight reduction % | | Appearance |
| --- | --- | --- | --- | --- | --- | --- | --- | --- | --- | --- | --- | --- | --- | --- | --- |
| | | | | Skin layer/core inner layer | Core surface layer/core inner layer | | | Core surface layer μm | Core inner layer μm | | | | | | |
| Example 1 | 50 | 50~60 | 5~10 | 1.20 | 1.15 | 3 | 1.61 | 50 | 250 | 2.5 | A | B | 32 | A | B |
| Example 2 | 30 | 50~60 | 5~10 | 1.33 | 1.19 | 3 | 1.78 | 80 | 410 | 1.9 | B | B | 38 | A | B |
| Example 3 | 71.4 | 50~60 | 5~10 | 1.12 | 1.05 | 1 | 1.30 | 60 | 200 | 4.0 | A | B | 23 | A | B |
| Example 4 | 50 | 60~70 | 1~5 | 1.30 | 1.15 | 3 | 1.60 | 50 | 260 | 2.1 | A | B | 30 | A | B |
| Example 5 | 50 | 35~45 | 15~30 | 1.15 | 1.10 | 3 | 1.60 | 40 | 90 | 2.7 | A | C | 34 | A | C |
| Comparative example 1 | 10 | 50~60 | 5~10 | 1.40 | 1.25 | 3 | 1.58 | 90 | 510 | 1.5 | D | C | 32 | A | B |
| Comparative example 2 | 72.2 | 50~60 | 5~10 | 1.25 | 1.20 | 0.005 | 1.45 | 220 | 730 | 2.0 | A | D | 19 | B | B |
| Comparative example 3 | 70 | 50~60 | 5~10 | 1.20 | 1.14 | 3 | 1.05 | 40 | 120 | 4.5 | A | B | 8 | D | B |

FOAM MOLDED ARTICLE

BACKGROUND

1. Technical Field

The present disclosure relates to a composite resin composition capable of realizing a foam molded article having excellent mechanical properties.

2. Description of the Related Art

So-called "general-purpose plastics" such as polyethylene (PE), polypropylene (PP), polystyrene (PS), and polyvinyl chloride (PVC) are not only very inexpensive, but also easy to mold, and a weight is a fraction of the weight of metals or ceramics. Therefore, general-purpose plastics are often used as materials for various daily necessities such as bags, various packaging, various containers, and sheets, and also used as materials for industrial components such as automobile parts, electrical parts, and daily necessities, and miscellaneous goods.

However, the general-purpose plastics have drawbacks such as insufficient mechanical strength. Therefore, the general-purpose plastics do not have sufficient properties required for materials used in various industrial products such as machinery products such as automobiles and electrical, electronic and information products, and the scope of application is currently limited.

On the other hand, so-called "engineer plastics" such as polycarbonate, a fluororesin, an acrylic resin, and polyamide have excellent mechanical properties, and used in machinery products such as automobiles and various industrial products such as electrical, electronic, and information products. However, engineer plastics are expensive, difficult to recycle monomers, and thus have a large environmental burden.

In this regard, there is a demand for greatly improving the material properties (such as mechanical strength) of general-purpose plastics. In order to reinforce the general-purpose plastics, a technique of improving the mechanical strength of the general-purpose plastics by dispersing a natural fiber that is a fibrous filler, a glass fiber, and a carbon fiber in a resin of the general-purpose plastics has been known. Among them, an organic fibrous filler such as cellulose has been attracting attention as a reinforcing fiber from the viewpoint of inexpensive and excellent environmental properties when discarded.

In addition, as a plastic that has been reduced in weight while taking advantage of the above-described properties, a foam molded article obtained by adding a foaming agent into a resin and foam-molded has been proposed.

For example, in Japanese Patent document No. 6351574, surface appearance and impact resistance are improved by foam molding a composite resin of low-concentration cellulose fibers uniformly dispersed in a polyamide resin.

SUMMARY

A foam molded article according to the present disclosure includes a main agent resin,
a filler of greater than or equal to 15% by mass and less than or equal to 80% by mass, and
a foaming agent of greater than or equal to 0.01% by mass and less than or equal to 10% by mass, in which
a foaming ratio caused by the foaming agent is 1.1 times or more.

BRIEF DESCRIPTION OF THE DRAWINGS

FIG. 5 is a diagram illustrating results of examples and comparative examples in the exemplary embodiment.

DETAILED DESCRIPTION

Figure 1:
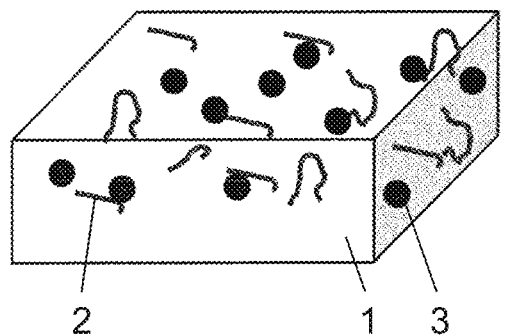
FIG. 1 is a schematic diagram illustrating a configuration of a foam molded article according to an exemplary embodiment of the present disclosure.

In Japanese Patent document No. 6351574, the impact resistance is improved by uniformly dispersing the cellulose fiber that is a fibrous filler; however, due to the low content of cellulose fiber, the impact resistance is insufficient in a case where a resin such as general-purpose plastic is used.

The present disclosure is made to solve the above problems in the related art, and an object thereof is to provide a foam molded article having weight reduction and impact resistance.

A foam molded article according to a first aspect includes a main agent resin,
a filler of greater than or equal to 15% by mass and less than or equal to 80% by mass, and
a foaming agent of greater than or equal to 0.01% by mass and less than or equal to 10% by mass, in which
a foaming ratio caused by the foaming agent is 1.1 times or more.

Regarding a foam molded article according to a second aspect, in the above first aspect, the foam molded article may include
a skin layer positioned on a surface;
a core surface layer positioned inside the skin layer and having a lower mass concentration of the filler than a mass concentration of the skin layer; and
a core inner layer positioned inside the core surface layer and having a lower mass concentration of the filler than a mass concentration of the core surface layer.

In other words, regarding the foam molded article according to a second aspect, in the above first aspect, the foam molded article may include
two skin layers; two core surface layers positioned between the two skin layers; and a core inner layer positioned between the two core surface layers, in which
the mass concentration of the filler in the core surface layer may be lower than a mass concentration of the skin layer, and the mass concentration of the filler in the core inner layer may be lower than a mass concentration of the core surface layer.

Regarding the foam molded article according to a third aspect, in the above second aspect, a ratio of the mass concentration of the filler in the skin layer to the mass concentration of the filler in the core inner layer may be greater than or equal to 1.05, and a ratio of the mass concentration of the filler in the core surface layer with respect to the mass concentration of the filler in the core inner layer may be greater than or equal to 1.02.

Regarding a foam molded article according to a fourth aspect, in the above second or third aspect, a cell diameter of the foaming agent contained in the core surface layer may be smaller than a cell diameter of the foaming agent contained in the core inner layer.

Regarding a foam molded article according to a fifth aspect, in the above second aspect, the cell diameter of the foam cell contained in the core surface layer may be greater than or equal to 40 μm and smaller than or equal to 80 μm, and the cell diameter of the foam cell contained in the core inner layer may be greater than or equal to 90 μm and smaller than or equal to 500 μm.

A foam molded article according to the sixth aspect, in any one of the first to fifth aspects, the filler may include a filler having an aspect ratio of lower than or equal to 2 and a filler having an aspect ratio of higher than or equal to 10.

A foam molded article according to a seventh aspect, in the above sixth aspect, in the filler, a proportion of the filler having an aspect ratio of lower than or equal to 2 may be higher than a proportion of the filler having an aspect ratio of higher than or equal to 10.

Regarding a foam molded article according to an eighth aspect, in the above seventh aspect, the proportion of the filler having an aspect ratio of lower than or equal to 2 in the fillers may be greater than or equal to 50% and less than or equal to 70%, and the proportion of the filler having an aspect ratio of higher than or equal to 10 in the fillers may be greater than or equal to 1% and less than or equal to 10%.

Hereinafter, the foam molded article according to the exemplary embodiment of the present disclosure will be described with reference to the accompanying drawings. In the following description, the same components are denoted by the same reference numerals, and description thereof is omitted as appropriate.

Exemplary Embodiment

FIG. 1 is a schematic diagram illustrating a configuration of foam molded article 10 according to an exemplary embodiment. Foam molded article 10 according to the exemplary embodiment includes main agent resin 1, filler 2 of greater than or equal to 15% by mass and less than or equal to 80% by mass, and a foaming agent of greater than or equal to 0.01% by mass and less than or equal to 10% by mass. This foaming agent has a foaming ratio of greater than or equal to 1.1 times. According to foam molded article 10, high strength and weight reduction can be realized by including filler 2 having the mass concentration in the above range and the foaming ratio caused by the foaming agent in the above range.

Hereinafter, constituent members constituting foam molded article 10 will be described.
Main Agent Resin In the exemplary embodiment, main agent resin 1 is preferably a thermoplastic resin in order to ensure excellent moldability. Examples of the thermoplastic resin include an olefin resin (including a cyclic olefin resin), a styrenic resin, a (meth)acrylic resin, an organic acid vinyl ester resin or a derivative thereof, a vinyl ether resin, a halogen-containing resin, a polycarbonate resin, a polyester resin, a polyamide resin, a thermoplastic polyurethane resin, a polysulfone resin (such as polyethersulfone, polysulfone), a polyphenylene ether resin (such as a polymer of 2,6-xylenol), a cellulose derivative (such as cellulose esters, cellulose carbamates, and cellulose ethers), a silicone resin (such as polydimethyl siloxane and polymethyl phenyl siloxane), a rubber or an elastomer (dibutadiene rubber such as polybutadiene and polyisoprene, a styrene-butadiene copolymer, an acrylonitrile-butadiene copolymer, an acrylic rubber, a urethane rubber, and a silicone rubber). The resin may be used alone or two or more types thereof may be used in combination. Main agent resin 1 is not limited to the above materials as long as it has thermoplasticity.

Among these thermoplastic resins, main agent resin 1 is preferably an olefin resin having a relatively low melting point. Examples of the olefin resin include a copolymer of olefin monomers, a copolymer of an olefin monomer and other copolymerizable monomers, in addition to homopolymers of olefin monomers. Examples of the olefin monomer include chain olefins (such as α-C2-20 olefins such as ethylene, propylene, 1-butene, isobutene, 1-pentene, 4-methyl-1-pentene, 1-octene); and cyclic olefins. These olefin monomers may be used alone or two or more types thereof may be used in combination. Among the olefin monomers, chain olefins such as ethylene and propylene are preferable. Examples of other copolymerizable monomers include fatty acid vinyl esters such as vinyl acetate and vinyl propionate; (meth)acrylic monomers such as (meth)acrylic acid, alkyl (meth)acrylate, glycidyl (meth)acrylate; unsaturated dicarboxylic acids or anhydrides thereof such as maleic acid, fumaric acid, and maleic anhydride; vinyl esters of carboxylic acids (such as vinyl acetate and vinyl propionate); cyclic olefins such as norbornene and cyclopentadiene; and dienes such as butadiene and isoprene. These copolymerizable monomers may be used alone or two or more types thereof may be used in combination. Specific examples of the olefin resin include polyethylene (such as low density, medium density, high density, or linear low density polyethylene), polypropylene, an ethylene-propylene copolymer, a copolymer of chain olefins (particularly α-C2-4 olefins) such as terpolymers such as ethylene-propylene-butene-1.

In the exemplary embodiment, the content of main agent resin 1 is preferably greater than or equal to 10% by mass and less than or equal to 85% by mass. It is more preferably greater than or equal to 15% by mass and less than or equal to 75% by mass, and is still more preferably greater than or equal to 20% by mass and less than or equal to 65% by mass. When the content of main agent resin 1 is less than 10% by mass, fluidity at the time of pellet molding and foam molding is deteriorated, and molding defects occur. On the other hand, when the content of main agent resin 1 exceeds 85% by mass, the effect of improving the strength of the foam molded article due to the addition of fibrous filler 2 is not able to be obtained.
Dispersant Next, the dispersant will be described. In this exemplary embodiment, a dispersant is contained for the purpose of improving the adhesiveness between fibrous filler 2 and main agent resin 1 or the dispersibility of fibrous filler 2 in main agent resin 1. Examples of the dispersant include various titanate coupling agents, silane coupling agents, unsaturated carboxylic acid, maleic acid, maleic anhydride, or modified polyolefin grafted with anhydrides thereof, fatty acid, fatty acid metal salt, and fatty acid ester. The silane coupling agent is preferably an unsaturated hydrocarbon type or an epoxy type. There is no problem even if the surface of the dispersant is treated and modified with a thermosetting or thermoplastic polymer component.

The content of the dispersant in the exemplary embodiment is preferably greater than or equal to 0.01% by mass and less than or equal to 20% by mass, is more preferably greater than or equal to 0.1% by mass and less than or equal to 10% by mass, and is still more preferably greater than or equal to 0.5% by mass and less than or equal to 5% by mass. When the content of the dispersant is less than 0.01% by mass, dispersion defects occur. On the other hand, when the content of the dispersant exceeds 20% by mass, the strength of the foam molded article is lowered. The dispersant is appropriately selected depending on the combination of main agent resin 1 and filler 2, and may not be added in the case of a combination that does not require the dispersant.

Fibrous Filler

Next, fibrous filler 2 will be described. In this exemplary embodiment, fibrous filler 2 (hereinafter, sometimes simply referred to as "fiber") is mainly used for the purpose of improving mechanical properties and improving a dimensional stability due to reduction in a coefficient of linear expansion in foam molded article 10 molded using a composite resin composition. For this purpose, fibrous filler 2 preferably has a higher elastic modulus than an elastic modulus of main agent resin 1, and specific examples thereof include a carbon fiber, a carbon nanotube, a pulp, cellulose, a cellulose nanofiber, lignocellulose, a lignocellulose nanofiber, a basic magnesium sulfate fiber (magnesium oxysulfate fiber), a potassium titanate fiber, an aluminum borate fiber, a calcium silicate fiber, a calcium carbonate fiber, a silicon carbide fiber, wollastonite, zonotlite, various metal fibers, natural fibers such as cotton, silk, and wool or hemp, a rejuvenated fiber such as a jute fiber, rayon, or cupra, semi-synthetic fibers such as acetate and promix, synthetic fibers such as polyester, polyacrylonitrile, polyamide, aramid, and polyolefin, and modified fibers obtained by chemically modifying those surfaces and terminals. Among them, from the viewpoint of availability, high modulus of elasticity, and low coefficient of linear expansion, carbons and celluloses are particularly preferable. From the viewpoint of environmental properties, natural fibers of celluloses are preferable.

The content (mass concentration) of fibrous filler 2 in the exemplary embodiment is preferably greater than or equal to 15% by mass and less than or equal to 85% by mass. It is more preferably greater than or equal to 20% by mass and less than or equal to 80% by mass, and is still more preferably greater than or equal to 30% by mass and less than or equal to 70% by mass. If the content (mass concentration) of fibrous filler 2 is less than 15% by mass, the effect of improving the strength of foam molded article 10 due to the addition of fibrous filler 2 is not able to be obtained. On the other hand, when the content (mass concentration) of fibrous filler 2 exceeds 85% by mass, the fluidity at the time of pellet molding and foam molding is deteriorated, and molding defects occur.

Figure 2:
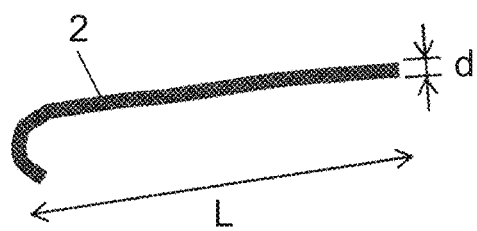
FIG. 2 is a schematic view for explaining a filler of the exemplary embodiment.

FIG. 2 is a schematic view for explaining filler 2 of the exemplary embodiment. The shape of fibrous filler 2 will be described. As illustrated in FIG. 2, symbol L is a length of fibrous filler 2 (hereinafter, may be referred to as "fiber length"), and symbol d is a width of fibrous filler 2 (hereinafter, may be referred to as "fiber diameter"). Fibrous filler 2 is preferably a mixed fiber of fibers 2A having a large aspect ratio (L/d) and fibers 2B having a small aspect ratio. If there are many fibers 2A having a large aspect ratio, the elastic modulus is increased. The aspect ratio of fiber 2A is preferably higher than or equal to 10. However, the impact resistance deteriorates when there are many fibers 2A having a large aspect ratio. Fiber aggregates are increased and the appearance deteriorates. On the other hand, when there are many fibers 2B having a small aspect ratio, the impact resistance is improved, and there are few fiber aggregates, resulting in excellent appearance. The aspect ratio of fiber 2B is preferably less than or equal to 2. However, if there are many fibers 2B having a small aspect ratio, the elastic modulus is decreased.

The relationship between the aspect ratio and the elastic modulus will be described. At the time of applying a stress to foam molded article 10, when there is fiber 2A having a large aspect ratio a fiber with high rigid is difficult to elongate, so that foam molded article 10 is not distorted. Therefore, the elastic modulus is increased. On the other hand, in a case of fiber 2B having a small aspect ratio, at the time of applying the stress, a strain suppressing effect by the fiber is weakened, and foam molded article 10 is strained, and thereby the elastic modulus is decreased.

The relationship between the aspect ratio and the impact resistance will be described. If there is fiber 2A having a large aspect ratio when the impact is applied to foam molded article 10, the fiber is not able to follow the elongation of the resin, and a crack enters between the resin and the fiber, which leads to be broken. On the other hand, in the case of fiber 2B having a small aspect ratio, since the fiber is fine, the fiber follows the elongation of the resin when the impact is applied to foam molded article 10, and the crack hardly enters between the resin and the fiber, so that it is not easily broken.

The relationship between the aspect ratio and the appearance will be described. By kneading both fiber 2A having a large aspect ratio and fiber 2B having a small aspect ratio, fiber 2B having a small aspect ratio is inserted between the fibers 2A having a large aspect ratio. The aggregation is suppressed and the appearance is improved.

As described above, it is preferable that fiber 2A having a large aspect ratio and fiber 2B having a small aspect ratio are mixed in foam molded article 10 from the viewpoint of the elastic modulus, the impact resistance, and the appearance. The relationship between the mixing ratios of the fibers can be calculated by simulation to improve the characteristics. Regarding the proportion of each fiber in fibrous filler 2, it is preferable that the existence ratio of fiber 2A having an aspect ratio of higher than or equal to 10 is greater than or equal to 1% and less than or equal to 10%, and the existence ratio of the fiber 2B having an aspect ratio of lower than or equal to 2 is greater than or equal to 50% and less than or equal to 70%.

The existence ratio of other fibers having an aspect ratio higher than 2 and lower than 10 is greater than or equal to 20% and less than or equal to 49%.

Next, the characteristics of fibrous filler 2 will be described. The kinds of main agent resin 1 and fibrous filler 2 are as described above. If fibrous filler 2 is excessively soft with respect to main agent resin 1, that is, if the elastic modulus is small, the composite resin composition has a low elastic modulus as a whole, resulting in a decrease in strength. On the other hand, if fibrous filler 2 is excessively hard with respect to main agent resin 1, that is, the elastic modulus is large, the impact wave generated at the time of impact is not propagated and is absorbed at the interface between main agent resin 1 and fibrous filler 2, so that cracks and crazes are likely to occur near the interface, resulting in a decrease in the impact strength. Therefore, the relationship between the elastic moduli of main agent resin 1 and fibrous filler 2 is preferably higher in the elastic modulus of fibrous filler 2, and the difference is preferably as small as possible. The optimum relationship is calculated from the simulation results, and the difference in the elastic modulus between main agent resin 1 and fibrous filler 2 is preferably within 20 GPa.

These fibrous fillers 2 are used for the purpose of improving the adhesiveness with main agent resin 1 or the dispersibility in the composite resin composition, and examples thereof include those subjected to a surface treatment with various titanate coupling agents, silane coupling agents, unsaturated carboxylic acid, maleic acid, maleic anhydride, or modified polyolefin grafted with anhydrides thereof, fatty acid, fatty acid metal salt, and fatty acid ester. Alternatively, there is no problem even if those subjected to the surface treatment with a thermosetting or thermoplastic polymer component are used.

Foaming Agent

Next, the foaming agent will be described. In the exemplary embodiment, the foaming agent is used for the purpose of supplying gas for forming bubbles, that is, foam cells, during foam molding. Here, the foam cell is a hole formed by gas generated by thermal decomposition of a foaming agent or gas generated by a change in solubility of dissolved gas in a resin. The foaming agents are roughly classified into chemical foaming agents and physical foaming agents, but there is no particular limitation. Examples of the chemical foaming agent include organic chemical foaming agents such as ADCA (azodicarbonamide), DPT (N,N'-dinitropentamethylene hand and lamin), OBSH (4,4'-oxybisbenzene sulfonyl hydrazide), and inorganic chemical foaming agents such as bicarbonates such as sodium bicarbonate, carbonates such as sodium carbonate, and a combination of bicarbonate and organic acid salt such as citrate. These chemical foaming agents may be used alone or two or more kinds thereof may be used in combination, and foaming aids (such as urea compounds and zinc compounds) may also be used. Examples of the physical foaming agent include liquefied gases such as chlorofluorocarbon gas, hydrocarbon gas, nitrogen gas, and carbon dioxide gas, and supercritical fluids such as nitrogen and carbon dioxide.

The content of the foaming agent in the exemplary embodiment is preferably greater than or equal to 0.01% by mass and less than or equal to 15% by mass. It is more preferably greater than or equal to 0.1% by mass and less than or equal to 10% by mass, and is still more preferably greater than or equal to 0.5% by mass and less than or equal to 5% by mass. When the content of the foaming agent is less than 0.01% by mass, the foaming nuclei are reduced, and thus the foam cell diameter is increased, the density variation in foam molded article 10 is increased, and thereby the appearance is deteriorated. On the other hand, when the content of the foaming agent exceeds 15% by mass, the strength of the foam molded article 10 is lowered.

Here, the relationship between the structure of foam molded article 10 and the impact resistance will be described. If the elastic modulus of the surface layer of foam molded article 10 is high, the rigidity of foam molded article 10 as a whole is enhanced, and when the impact is applied to foam molded article 10, the impact can be absorbed inside foam molded article 10 and the impact resistance is improved.

The relationship between the structure of foam molded article and the appearance will be described. The absence of foam cells 3 on the surface of foam molded article 10 suppresses the deterioration of the surface roughness due to foam cells 3 and improves the appearance.

As described above, from the viewpoint of the impact resistance and the appearance, it is preferable to employ a layer structure in which foam molded article 10 has a high elastic modulus in a surface layer portion, and there is no foam cell 3, and the impact can be absorbed in foam molded article 10, and weight reduction can be realized.

Figure 3:
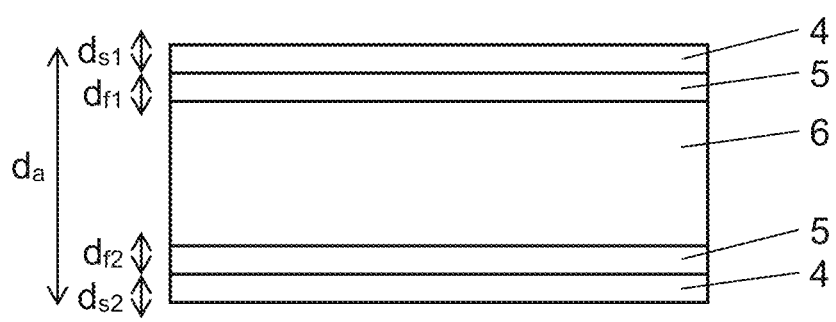
FIG. 3 is a schematic view for explaining a skin layer, a core surface layer, and a core inner layer of the foam molded article of the exemplary embodiment.

FIG. 3 is a schematic view for explaining skin layer 4, core surface layer 5, and a core inner layer 6 of foam molded article 10 of the exemplary embodiment. From the above, as illustrated in FIG. 3, foam molded article 10 in the exemplary embodiment is formed of skin layer 4, core surface layer 5, core inner layer 6, core surface layer 5, and skin layer 4 in order. Here, the layers having the same name have the same characteristics, and the thicknesses of skin layer 4 and core surface layer 5 will be described as the thickness of the two layers.

Here, as illustrated in FIG. 3, the thickness of first (upper) skin layer 4 is set as $d_{s1}$, and the thickness of a second (lower) skin layer 4 is set as $d_{s2}$. Thickness $d_s$ of skin layer 4 of the two layers included in foam molded article 10 is the total of thickness $d_{s1}$ of first skin layer 4 and thickness $d_{s2}$ of second skin layer 4. Similarly, the thickness of first (upper) core surface layer 5 is set as $d_{f1}$, and the thickness of second (lower) core surface layer 5 is $d_{f2}$. Thickness $d_f$ of core surface layer 5 of the two layers included in foam molded article 10 is the total of thickness $d_{f1}$ of first core surface layer 5 and thickness $d_{f2}$ of second core surface layer 5.

Skin Layer

The skin layer 4 is a layer that does not have foam cell 3, a mass concentration ratio (amount of fibrous filler in skin layer/amount of fibrous filler in core inner layer) of the amount of fibrous filler 2 in skin layer 4 and core inner layer 6 is preferably greater than or equal to 1.05 and less than or equal to 1.6. The ratio (skin layer thickness $d_s$/foam molded article thickness $d_a$) of the thickness of skin layer 4 to the thickness of the entire foam molded article 10 is preferably greater than or equal to 0.01 and less than or equal to 0.5.

When skin layer 4 has foam cells 3, the appearance defects occur, the surface elastic modulus is insufficient, and the impact resistance is reduced. When the mass concentration ratio of the amount of fibrous filler 2 of skin layer 4 to the amount of fibrous filler 2 of core inner layer 6 is less than 1.05, the elastic modulus of the surface of foam molded article 10 is insufficient and the impact resistance is deteriorated. In a case where the ratio of the amount of fibrous filler 2 in skin layer 4 to the amount of fibrous filler 2 of core inner layer 6 exceeds 1.6, since the strength difference between the layers of foam molded article 10 is increased, the shock wave generated at the time of impact does not follow, and cracks and the like are likely to enter, thereby deteriorating the impact resistance.

When the ratio (skin layer thickness $d_s$/foam molded article thickness $d_a$) of the thickness of skin layer 4 to the thickness of foam molded article 10 is less than 0.01, the elastic modulus of the surface is insufficient and the impact resistance is deteriorated; on the other hand, when it exceeds 0.5, the overall density is affected, and thereby weight reduction is not able to be realized.

Core Surface Layer

Next, core surface layer 5 will be described. Core surface layer 5 is a layer including foam cell 3, a mass concentration ratio (fibrous filler amount in the skin layer/fibrous filler amount in the core inner layer) of the amount of fibrous filler 2 in core surface layer 5 and core inner layer 6 is greater than or equal to 1.02 and less than or equal to 1.5, and a ratio (core surface layer thickness $d_f$/foam molded article thickness $d_a$) of the thickness of core surface layer 5 to the thickness of foam molded article 10 is greater than or equal to 0.01 and less than or equal to 0.5, and a diameter of foam cell 3 in core surface layer 5 is preferably smaller than or equal to 80 μm. Core surface layer 5 is an intermediate layer between skin layer 4 and core inner layer 6, and reduces the strength difference between skin layer 4 and core inner layer 6 so as to improve the impact resistance. Therefore, core surface layer 5 preferably has an intermediate strength between skin layer 4 and core inner layer 6. When the foam cell diameter of core surface layer 5 exceeds 80 μm, since the strength difference with skin layer 4 is partially increased, the shock wave generated at the time of impact does not follow, and cracks and the like are likely to enter, thereby deteriorating the impact resistance. When the mass concentration ratio of the amount of fibrous filler 2 of core surface layer 5 to the amount of fibrous filler 2 of core inner layer 6 is less than 1.02, the elastic modulus of the surface of foam molded article 10 is insufficient and the impact resistance is deteriorated. In a case where the mass concentration ratio of the amount of fibrous filler 2 in core surface layer 5 to the amount of fibrous filler 2 of core inner layer 6 exceeds 1.5, since the strength difference between the layers of foam molded article 10 is increased, the shock wave generated at the time of impact does not follow, and cracks and the like are likely to enter, thereby deteriorating the impact resistance.

When the ratio (core surface layer thickness $d_f$/foam molded article thickness $d_a$) of the thickness of core surface layer 5 to the thickness of foam molded article 10 is less than 0.01, the elastic modulus of the surface is insufficient and the impact resistance is deteriorated; on the other hand, when it exceeds 0.5, the overall density is affected, and thereby weight reduction is not able to be realized.

Core Inner Layer

Next, core inner layer 6 in the exemplary embodiment will be described. Core inner layer 6 is a layer having foam cells 3, and the foam cell diameter in core inner layer 6 is preferably smaller than or equal to 500 μm. When the cell diameter of core inner layer 6 exceeds 500 μm, cracks and the like are likely to enter from the location where the foam cell diameter is large, thereby deteriorating the impact resistance.

Method of Producing Foam Molded Article

Figure 4:
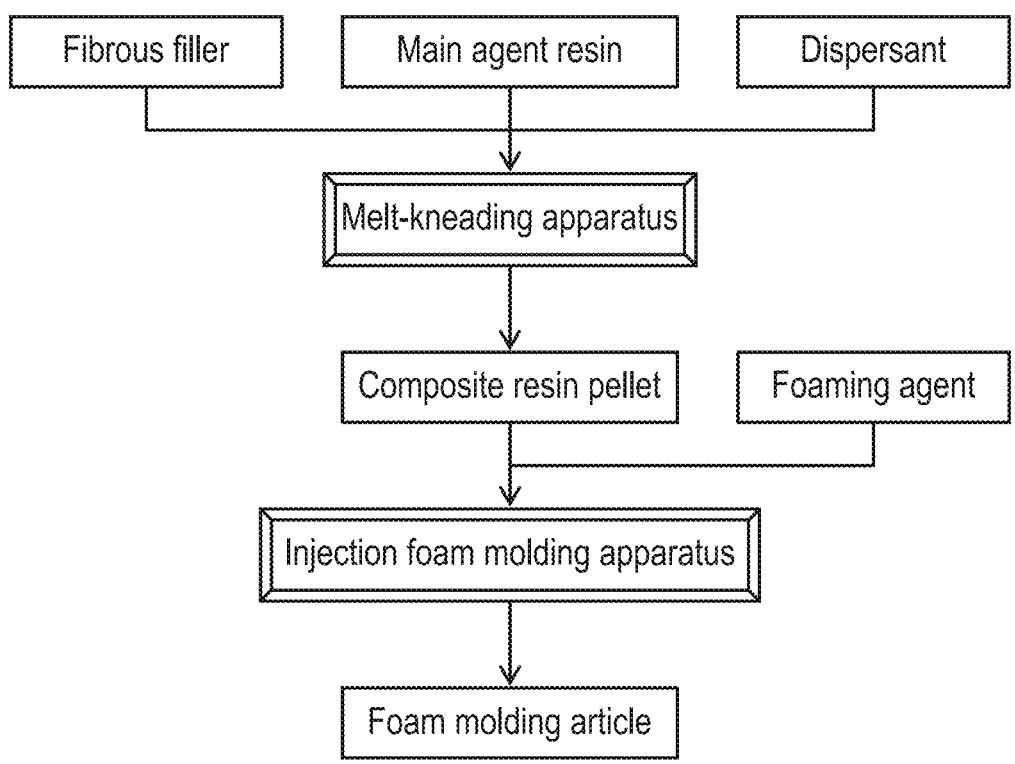
FIG. 4 is a flowchart of a method for producing a foam molded article according to the exemplary embodiment.

Next, a method of producing foam molded article 10 will be described. FIG. 4 is a flowchart of the method of producing foam molded article 10 according to the exemplary embodiment. (1) First, main agent resin 1, fibrous filler 2, and a dispersant as necessary are put into a melt-kneading apparatus and the mixture is melt-kneaded in the apparatus. As a result, main agent resin 1 is melted, and fibrous filler 2 and the dispersant are dispersed in molten main agent resin 1. At the same time, due to a shearing action of the apparatus, defibration of aggregates of fibrous filler 2 is promoted, and fibrous filler 2 can be finely dispersed in main agent resin 1.

In the related art, as fibrous filler 2, those obtained by defibrating fillers in advance by pretreatment such as wet dispersion have been used. However, when fibrous filler 2 is defibrated in advance in a solvent used for wet dispersion, since it is easy to be defibrated as compared with a case of being defibrated in the melted main agent resin 1, it is difficult to defibrate only the ends, and entire fibrous filler 2 may be defibrated. In addition, there was a problem that the number of steps was increased by adding the pretreatment, and the productivity was deteriorated.

On the other hand, in the producing process of the foam molded article in the exemplary embodiment, a melt-kneading treatment (total dry method) is performed together with main agent resin 1 and the dispersant without the pretreatment by wet dispersion for the purpose of a defibration treatment and a modification treatment of fibrous filler 2. In this method, since the wet dispersion treatment of fibrous filler 2 is not performed, as described above, only the end portion of fibrous filler 2 can be defibrated, and the number of steps can be reduced to improve the productivity.

In order to produce the composite resin composition in the exemplary embodiment by the total dry method, it is preferable that high shear stress is applied during kneading, and specific examples of kneading means include methods with a single-screw kneader, a twin-screw kneader, a roll kneader, and a Banbury mixer. From the viewpoint of easy application of high shear and high productivity, continuous biaxial kneaders and continuous roll kneaders are particularly preferred. The kneading means other than the above may be used as long as it can apply a high shear stress.

(2) The composite resin composition extruded from a melt-kneader is made into a pellet shape through a cutting step by a pelletizer or the like. Examples of a method of pelletization, as a method to be performed immediately after melting the resin, include an aerial hot cut method, an underwater hot cut method, and a strand cut method. Alternatively, there is a pulverization method in which a molded article or sheet is once formed and then pulverized and cut.

(3) In a case of using a chemical foaming agent, an injection molded product as foam molded article 10 can be produced by dry blending the pellets and the chemical foaming agent before injection foam molding and then performing the injection foam molding. In a case of using a physical foaming agent, an injection molded product as a foam molded article can be produced by injecting the above pellets into an injection foam molding machine, injecting the physical foaming agent after melting, and performing the injection foam molding. Hereinafter, each example and each comparative example in the experiment conducted by the present inventors will be described.

Example 1

A pulp-dispersed polypropylene composite foam molded article was produced by the following production method.

Softwood pulp (trade name: NBKP Celgar, manufactured by Mitsubishi Paper Mills Limited.) was used as a starting material for the fibrous filler. This softwood pulp was pulverized with a pulverizer to obtain a mixture of fillers with different fibrous filler aspect ratios. Each aspect ratio was adjusted in the grinding process. Polypropylene as the main agent resin (trade name: J108M, prepared by Prime Polymer Co., Ltd.), the fibrous filler, and maleic anhydride as a dispersant (trade name: Yumex, prepared by Sanyo Chemical Industries, Ltd.) were weighed to a weight ratio of 42:50:5 and were dry blended. Thereafter, the mixture was melt-kneaded and dispersed with a twin-screw kneader (KRC Kneader manufactured by Kurimoto, Ltd.). The resin melt was hot-cut to produce a pulp-dispersed polypropylene pellet.

The produced pulp-dispersed polypropylene pellet and polyslen as a foaming agent (prepared by Eiwa Chemical Ind. Co., Ltd.) were weighed to a weight ratio of 97:3 and were dry blended. Thereafter, a test piece of a foam molded article was produced using an injection foam molding machine (180AD, manufactured by The Japan Steel Works, Ltd.) using a core back method at a foaming ratio of 1.6 times. The test piece was prepared under the following manufacturing conditions: resin temperature of 190° C., mold temperature of 40° C., injection speed of 100 mm/s, and holding pressure of 60 MPa. Each layer structure was adjusted by an injection foaming process and a material composition. The pellet and foaming agent were bitten into the screw of the molding machine through a hopper, and the penetration at that time was measured by the amount of pellet decrease per hour, and as a result, it was confirmed to be constant. The shape of the test piece was changed according to the evaluation items described below, and a No. 1 size dumbbell was manufactured for measuring the elastic modulus. A foam molded article with 60 mm square and a thickness of 1.6 mm was manufactured for a drop impact test and for appearance confirmation. In addition, in order to evaluate the foaming ratio, a composite resin molded article was also manufactured from the above flat plate not subjected to foam molding. The obtained pulp-dispersed polypropylene composite foam molded article test piece was evaluated by the following method.

Foaming Ratio

The foaming ratio was measured from the ratio of the apparent density of a test piece of the obtained flat foam molded article and a test piece of a molded article not foamed. Here, as an evaluation method of the apparent density, the volume was calculated from the measurement result of the molded article size with calipers, and the apparent density was calculated from the result of the weight measured with a precision balance so as to calculate the ratio. As a result of evaluating the foaming ratio, it was 1.61 times.

Foam Cell Diameter

The cross section of the obtained pulp-dispersed polypropylene composite foam molded article was exposed by a CP treatment, and the foam cell diameter was observed by SEM observation. As a result of measuring about 10 typical foam cells in the core surface layer and the core inner layer, the maximum diameter of foam cell 3 in the core surface layer was 50 µm, and the diameter of foam cell 3 in the core inner layer was 250 µm.

Pulp Amount

The cross section of the obtained pulp-dispersed polypropylene composite foam molded article was exposed by a CP treatment, and the peak intensity of 3400 cm−1 was evaluated by infrared spectroscopy. The ratio of the skin layer to the core inner layer was 1.2. The ratio of the core surface layer to the core inner layer was 1.15.

Aspect Ratio of Fiber

The obtained pulp-dispersed polypropylene pellet was immersed in a xylene solvent to dissolve the polypropylene, and the shape of the remaining pulp fibers was observed by SEM. As a result of measuring about 50 representative fibers and five places, the ratio of aspect ratio of higher than or equal to 10 was greater than or equal to 5% and less than or equal to 10%, and the ratio of aspect ratio of lower than or equal to 2 was greater than or equal to 50% and less than or equal to 60%.

Elastic Modulus of Foam Molded Article

A tensile test was carried out using the obtained No. 1 dumbbell-shaped test piece. Here, as the evaluation method of the elastic modulus, the numerical value of less than 1.6 GPa was evaluated as D, the value of greater than or equal to 1.6 GPa and less than 2.0 GPa was evaluated as B, and the value of greater than or equal to 2.0 GPa was evaluated as A. The elastic modulus of the test piece was 2.5 GPa, and was evaluated as A.

Drop Impact Test of Foam Molded Article

A drop impact test was carried out using the obtained flat test piece. Specifically, a 250 g weight pyramid was dropped from a height of 80 cm toward the plate surface of the test piece to confirm whether cracks enter or not. As this evaluation method, a case where no crack was confirmed was marked as B, a case where cracks were found only on the surface, and the length of the crack was less than 10 mm was marked as C, and a case where the crack which penetrated was confirmed or the length of the crack was greater than or equal to 10 mm was marked as D. The test piece was not cracked, and evaluated as B.

Weight Reduction Rate

The specific rigidity was calculated from the results of the apparent density and the elastic modulus at the time of foaming ratio calculation, and the weight reduction rate was calculated from the ratio of the aforementioned specific rigidity to the specific rigidity of polypropylene simple substance. Here, as the evaluation method of the weight reduction rate, the numerical value of less than 15% was evaluated as D, the value of greater than or equal to 15% and less than 20% was evaluated as B, and the value of greater than or equal to 20% was evaluated as A. As a result of calculating the weight reduction rate, it was 32% and evaluated as A.

Appearance of Foam Molded Article

Sensory evaluation was performed to determine whether a visible level of fiber agglomerates appeared as white spots or bubbles were visible on the foam molded article. A foam molded article without traces of the white spots or the bubbles was marked as B, and a case where the traces of the white spots or the bubbles were present or the traces of the white spots or the bubbles had been present was marked as C.

Example 2

In Example 2, a pulp-dispersed polypropylene pellet and a foam molded article were produced under the same material conditions and process conditions as in Example 1 except that polypropylene, a cotton-like softwood pulp, and maleic anhydride were weighed to be 62:30:5 at a weight ratio, and dry blended, and a target foaming ratio was changed to 1.8 times. Regarding the evaluation, the same evaluation as in Example 1 was performed.

Example 3

In Example 3, a pulp-dispersed polypropylene pellet and a foam molded article were produced under the same material conditions and process conditions as in Example 1 except that polypropylene, a cotton-like softwood pulp, and maleic anhydride were weighed to be 22:70:5 at a weight ratio, and dry blended, and a target foaming ratio was changed to 1.3 times, the pulp-dispersed polypropylene pellet and the polyslene was weighed to be 99:1 at a weight ratio. Regarding the evaluation, the same evaluation as in Example 1 was performed.

Example 4

In Example 4, a pulp-dispersed polypropylene pellet and a foam molded article were produced under the same material conditions and process conditions as in Example 1 except that pulp pulverization time was changed to be longer. Regarding the evaluation, the same evaluation as in Example 1 was performed.

Example 5

In Example 5, a pulp-dispersed polypropylene pellet and a foam molded article were produced under the same material conditions and process conditions as in Example 1 except that pulp pulverization time was changed to be shorter. Regarding the evaluation, the same evaluation as in Example 1 was performed.

Comparative Example 1

In Comparative Example 1, a pulp-dispersed polypropylene pellet and a foam molded article were produced under the same material conditions and process conditions as in Example 1 except that polypropylene, a cotton-like softwood pulp, and maleic anhydride were weighed to be 82:10:5 at a weight ratio, and dry blended, and a target foaming ratio was changed to 1.6 times. Regarding the evaluation, the same evaluation as in Example 1 was performed.

Comparative Example 2

In Comparative Example 2, a pulp-dispersed polypropylene pellet and a foam molded article were produced under the same material conditions and process conditions as in Example 1 except that polypropylene, a cotton-like softwood pulp, and maleic anhydride were weighed to be 22:70:5 at a weight ratio, and dry blended, and the pulp-dispersed polypropylene pellet and the polyslene were weighed to be 99.995:0.005 at a weight ratio. Regarding the evaluation, the same evaluation as in Example 1 was performed.

Comparative Example 3

In Comparative Example 3, a pulp-dispersed polypropylene pellet and a foam molded article were produced under the same material conditions and process conditions as in Example 1 except that polypropylene, a cotton-like softwood pulp, and maleic anhydride were weighed to be 22:70:5 at a weight ratio, and dry blended, and a target foaming ratio was changed to 1.05 times. Regarding the evaluation, the same evaluation as in Example 1 was performed.

The measurement results in Examples 1 to 5 and Comparative Examples 1 to 3 are illustrated in FIG. 5.

As is clear from FIG. 5, Example 2 in which the amount of fibrous filler was decreased and the foaming ratio was increased resulted in a slightly inferior elastic modulus; however, the effects of the skin layer and core surface layer caused the deterioration of the impact resistance to be suppressed. On the contrary, Example 3 in which the amount of fibrous filler was increased and the foaming ratio was decreased resulted in slightly inferior weight reduction; however, the fibrous fillers with different aspect ratios were mixed and the skin layer did not have foam cells, which caused the deterioration of the appearance to be suppressed. In Example 4 in which the amount of the fibrous filler having an aspect ratio of 10 was reduced, the elastic modulus was slightly reduced, but it was confirmed that there was no problem. It was confirmed that if greater than or equal to 10% by mass and less than or equal to 85% by mass of the main agent resin, greater than or equal to 15% by mass and less than or equal to 85% by mass of the filler, greater than or equal to 0.01% by mass and less than or equal to 20% by mass of the dispersant, and greater than or equal to 0.01% by mass and less than or equal to 15% by mass of the foaming agent were contained, and the foaming ratio was greater than or equal to 1.1 times, a foam molded article with both high strength and weight reduction was obtained.

In Comparative Example 1 where the amount of fibrous filler was reduced to 10%, the elastic modulus was insufficient due to the small amount of the fibrous filler. Since the fibrous filler also acted as a foam nucleating agent, the diameter of foam cell 3 was also increased. As a result, the impact resistance was decreased and cracks occurred in the impact test.

In Example 5 where the proportion of fibers having an aspect ratio of the fibrous filler higher than or equal to 10 was increased, while the elastic modulus was slightly higher, the impact resistance was reduced and cracks occurred in the impact test. The white spots were observed in the foam molded article due to aggregation of fibers having a large aspect ratio.

In Comparative Example 2 in which the amount of the foaming agent was reduced to 0.005%, the foaming ratio was lower than the target foaming ratio. Due to very small amount of the foaming agent that become as a foam core, the foam cell diameter was increased, and thus there is no problem in the elastic modulus. However, uniformity and the impact resistance were deteriorated, and cracks occurred in the impact test.

In Comparative Example 3 in which the foaming ratio was reduced to 1.05, due to the small foaming ratio, there was no problem in the elastic modulus and the impact resistance, but the weight reduction was not able to be achieved.

From the above evaluation, when the composite resin composition in the foam molded article contains greater than or equal to 10% by mass and less than or equal to 85% by mass of the main agent resin, greater than or equal to 15% by mass and less than or equal to 85% by mass of the filler, greater than or equal to 0.01% by mass and less than or equal to 15% by mass of the foaming agent, and the foaming ratio caused by the foaming agent was greater than or equal to 1.1 times, the high strength and the weight reduction can be realized. It was found that when the existence ratio of the fiber having an aspect ratio of the further added fibrous filler, higher than or equal to 10 was greater than or equal to 1% and less than or equal to 10%, and the existence ratio of the fiber having an aspect ratio of lower than or equal to 2 was greater than or equal to 50% and less than or equal to 70%, a foam molded article having excellent appearance without fiber aggregates can be obtained.

Note that, the present disclosure includes appropriate combinations of any exemplary embodiment and/or example among the above-described various exemplary embodiments and/or examples, and exhibits an effect of each exemplary embodiment and/or example.

As described above, according to the foam molded article of the present disclosure, both high impact resistance and weight reduction can be achieved, and an excellent appearance can be realized.

According to the foam molded article of the present disclosure, it is possible to provide a foam molded article that is excellent in the mechanical strength as compared with the general-purpose resin in the related art. According to the present disclosure, since the properties of the main agent resin can be improved, it can be used as an alternative to engineering plastics or an alternative to metallic materials. Therefore, the manufacturing cost of various industrial products made of engineering plastics or metals, or daily necessities can be greatly reduced. It can also be used for home appliance casings, building materials, and automotive parts.

What is claimed is:

1. A foam molded article produced from a composition comprising:
   a main agent resin;
   greater than or equal to 15% by mass and less than or equal to 80% by mass, based on the composition, of a filler; and a plurality of foam cells formed by a foaming agent,
wherein a foaming ratio caused by the foaming agent is 1.1 times or more wherein,
the filler is a mixed fiber including a first fiber having a first aspect ratio (length (L)/diameter (d)) and a second fiber having a second aspect ratio (L/d), wherein the first aspect ratio is lower than the second aspect ratio, and
the first aspect ratio of the first fiber is less than or equal to 2 and the second aspect ratio of the second fiber is greater than or equal to 10.

2. The foam molded article of claim 1,
wherein in the filler, a proportion of the first fiber is greater than a proportion of the second fiber.

3. The foam molded article of claim 2,
wherein the proportion of the first fiber in the filler is greater than or equal to 50% and less than or equal to 70%, and the proportion of the second fiber in the filler is greater than or equal to 1% and less than or equal to 10%.

4. The foam molded article of claim 1, wherein a cell diameter of each of the plurality of foam cells is greater than or equal to 90 μm and smaller than or equal to 500 μm.

5. The foam molded article of claim 4, wherein
the foam molded article includes a core inner layer that includes the main agent resin, the filler, and the plurality of foam cells, the core inner layer including a first surface and a second surface that are opposite to each other,
the foam molded article further comprises:
  a first core surface layer that is positioned on the first surface of the core inner layer, and
  a second core surface layer that is positioned on the second surface of the core inner layer,
the first and the second core surface layers include a plurality of foam cells, and
a cell diameter of each of the plurality of foam cells of the first and the second core surface layers is greater than or equal to 40 μm and smaller than or equal to 80 μm.

6. The foam molded article of claim 5, further comprising:
a first skin layer that is positioned on the first core surface layer, and
a second skin layer that is positioned on the second core surface layer, wherein the first and the second skin layers do not include foam cells.

* * * * *